Patented Feb. 23, 1932

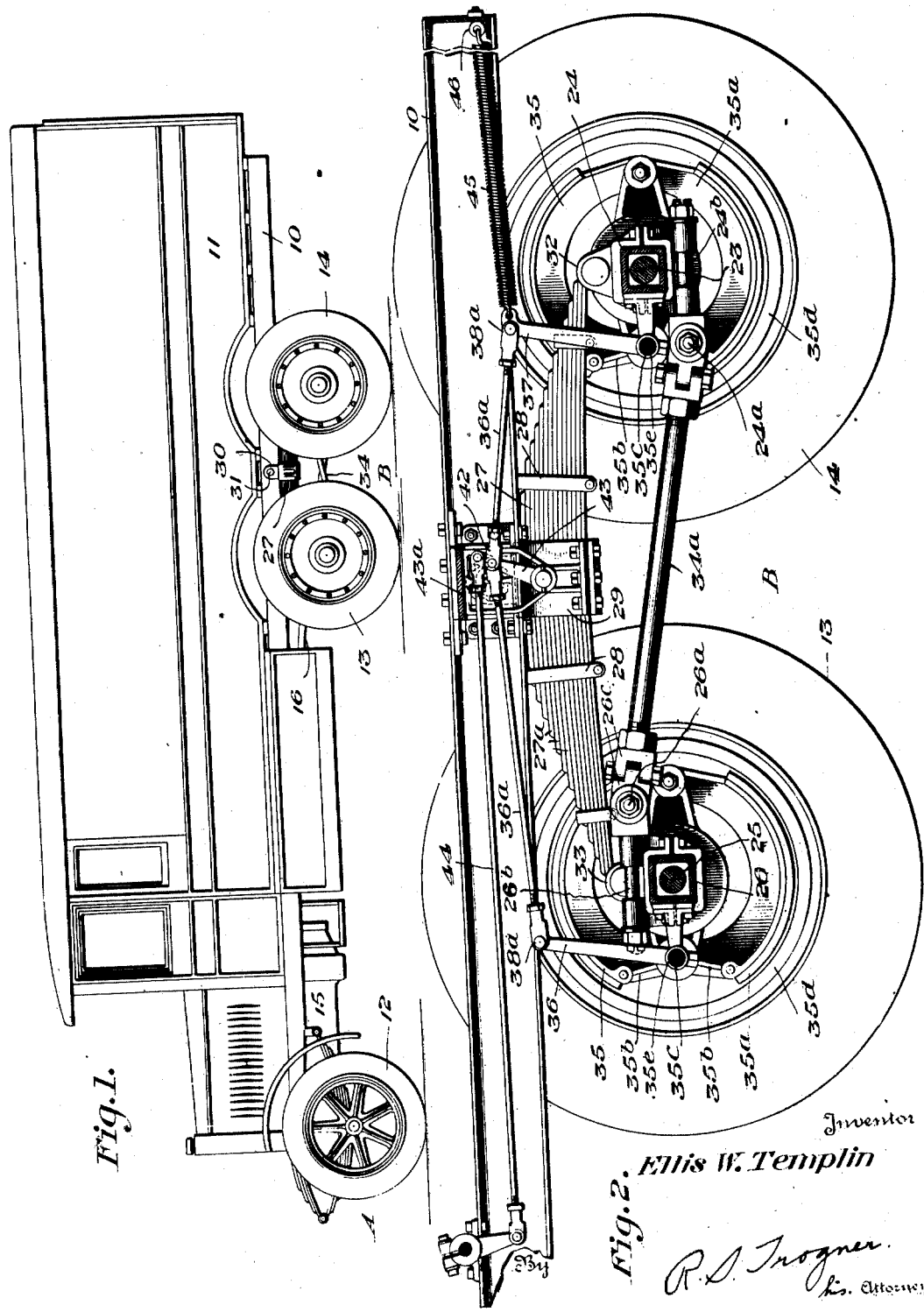

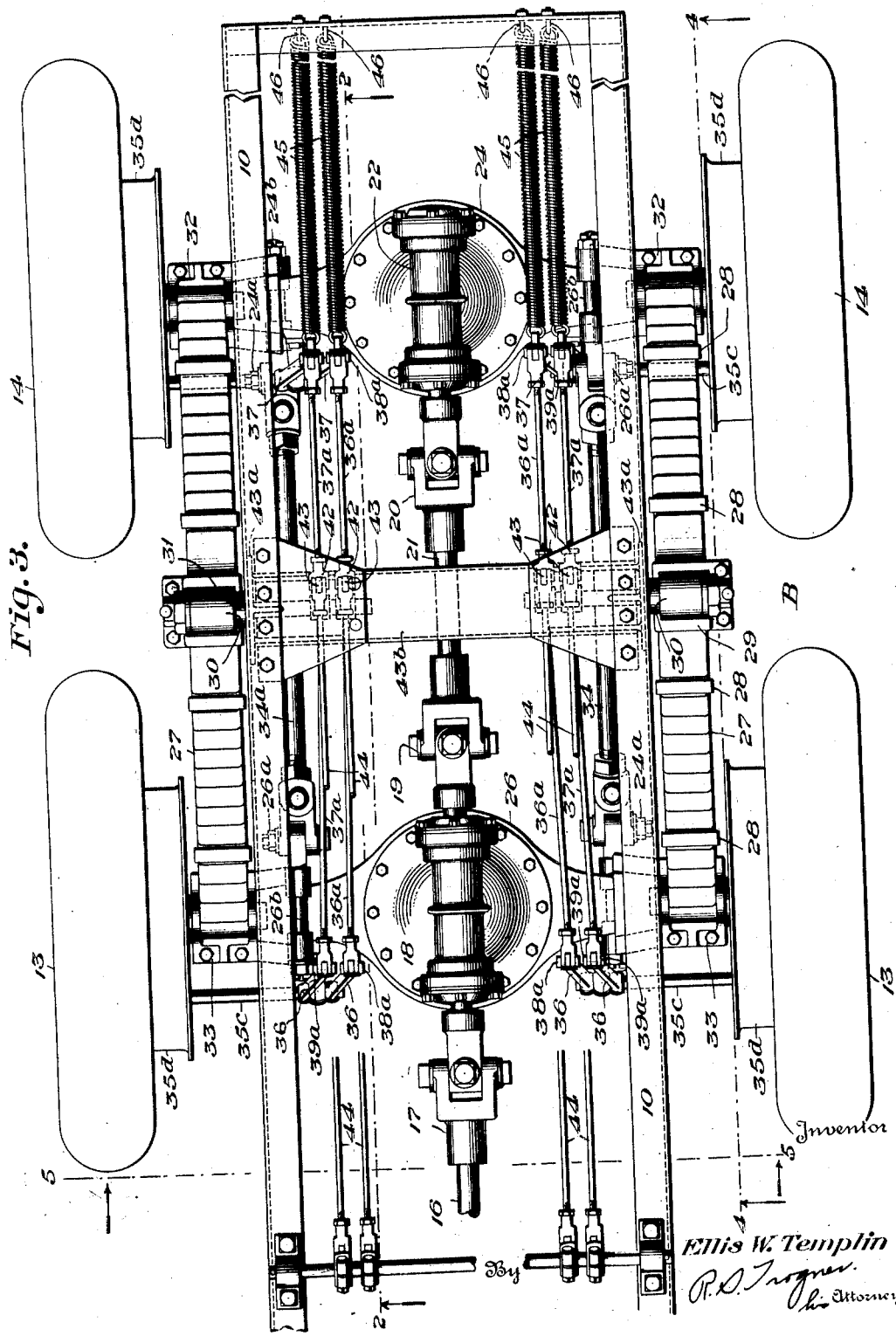

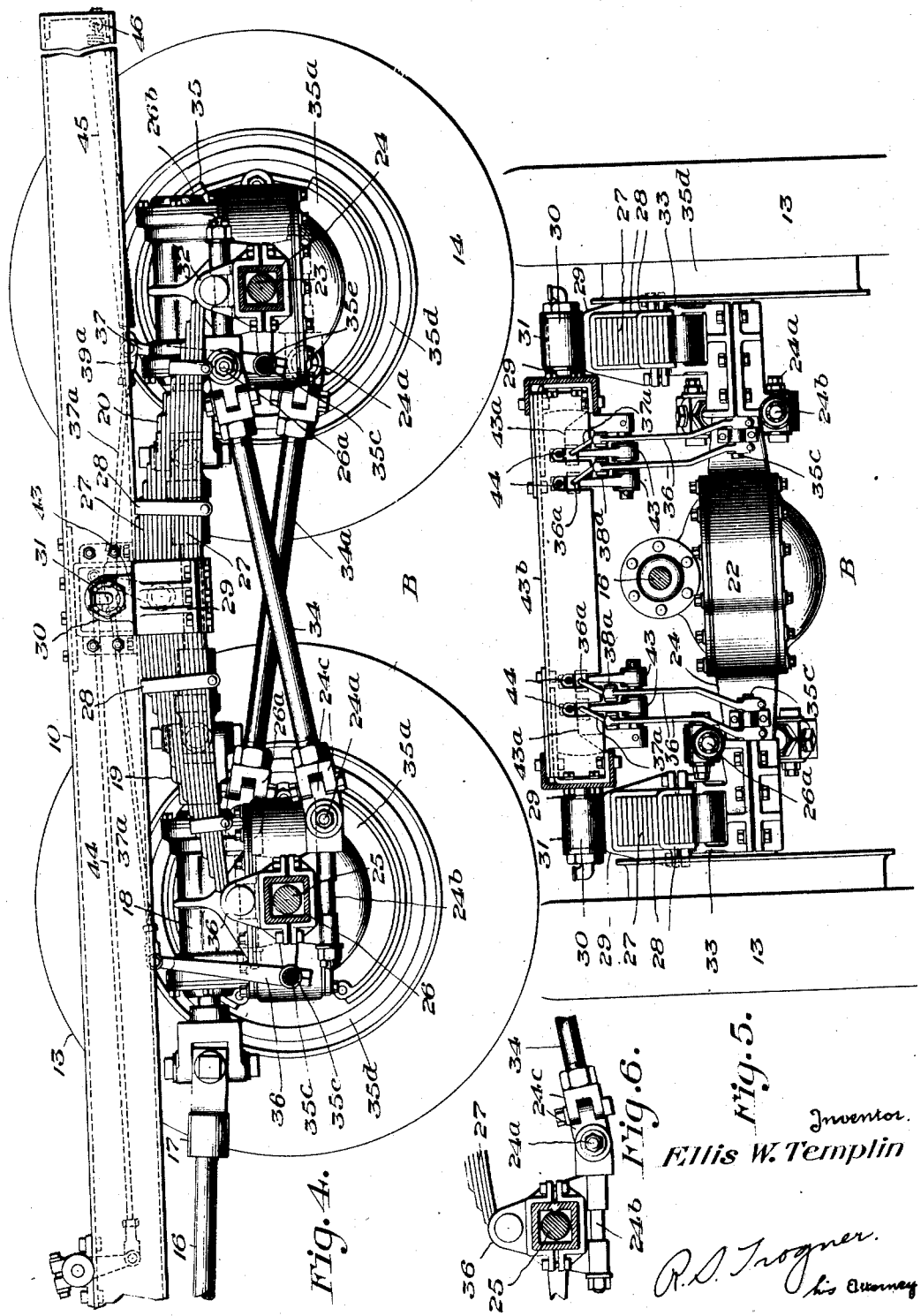

1,846,284

UNITED STATES PATENT OFFICE

ELLIS W. TEMPLIN, OF AKRON, OHIO, ASSIGNOR TO THE GOODYEAR TIRE & RUBBER COMPANY, OF AKRON, OHIO, A CORPORATION OF OHIO

RUNNING GEAR FOR MOTOR VEHICLES

Application filed May 17, 1920. Serial No. 382,046.

This invention relates to motor vehicles, and more particularly to motor vehicles of heavy-duty commercial type, and it has for its primary object the provision of an improved vehicle running-gear embodying a plurality of live or driving axles with a corresponding number of pairs of traction producing drive wheels.

Heretofore the common practice followed in the manufacture of heavy-duty commercial vehicles has been to provide the chassis with a running-gear comprising a steering truck or front axle member carrying a pair of steering wheels and a driving truck comprising a single rear axle carrying a pair of traction providing wheels which are positively driven by the motor of the vehicle, either through direct connection with the wheels themselves or, as is more often the case, through direct connection between the motor and live axle sections carrying the two rear wheels. With motor vehicles of relatively large load carrying capacities, such as those capable of carrying three and one half tons or more, this practice necessitates the employment of very large, heavy and unwieldy drive wheels and tires. Furthermore, if pneumatic tires, which are acknowledgedly the best type of tires, are employed they are of necessity very large, heavy, expensive and difficult to handle.

It is a well known fact that the rear truck element of a motor vehicle, and particularly of a motor vehicle of heavy-duty commercial type, supports the greater portion of the weight of the vehicle and of its load. With this in mind, my invention comprehends the provision of a rear truck element comprising a plurality of cooperatively driven axles each provided with a pair of traction producing wheels so that the rear load of the vehicle may be uniformly distributed over, or divided amongst, a plurality of pairs of wheels to thereby decrease the pressure exerted by each wheel upon the road bed. This more highly sub-divided and uniform distribution of the load not only lessens the destructive effects of the vehicle on the road, but also allows the advantageous use of smaller and lighter driving wheels and tires, and prolongs the useful life of the tires. In fact, by practicing my invention, it is possible to employ drive wheels and tires of the same size as those of the steering truck (i. e. front wheels), so that it is practicable to operate the motor vehicle with a full tire equipment, including spares, in which all of the tires are of a size.

Another object of my invention is to provide a running-gear embodying a plurality of pairs of drive wheels, which shall be so mounted and actuated as to insure suitable operating characteristics and uniform tractive qualities even over rough or badly cut up road beds, the arrangement being such that each drive wheel shall deliver its proper tractive power at all times irrespective of the relative positions of the several drive wheels to each other and to the steering wheels of the front truck element. By this means I insure greatly increased traction and at the same time materially reduce any tendency toward skidding.

A further object which I have in view is the provision of a suitable braking mechanism, of any desired or well known type, so correlated with the several drive wheels of the driving truck that its operation shall be positive, certain and uniform, irrespective of the load or of any inequalities in the road and consequent changes in the relative positions of the wheels upon which the brakes operate.

Other objects and advantages, including comparative lightness, simplicity of construction, and accessibility of parts, will become apparent from a perusal of the following description in conjunction with the accompanying drawings, wherein I have illustrated a preferred embodiment of my invention as it has been reduced to practice.

It will be understood that while I have illustrated a vehicle embodying a forward or steering truck having a single pair of wheels and a rear or drive truck comprising two drive units, each including a live axle provided with a pair of drive wheels, making six wheels in all, the number of wheels employed in either or both of the trucks may be varied at will and the number of drive units utilized may be increased without in any sense departing from the spirit of my invention as hereinafter described and claimed.

In the drawings, in the several views of which corresponding reference characters indicate like parts throughout:

Fig. 1 is a side elevation of a motor vehicle constructed in accordance with my invention;

Fig. 2 is a fragmentary longitudinal vertical sectional view taken substantially along the line 2—2 of Fig. 3, looking in the direction of the arrows and showing certain of the parts in elevation;

Fig. 3 is a top plan view of the drive-truck element embodying my invention;

Fig. 4 is a longitudinal vertical section of the drive-truck element taken substantially along the line 4—4 of Fig. 3, looking in the direction of the arrows;

Fig. 5 is a front elevation of the drive-truck, certain of the parts being shown in section as taken along the line 5—5 of Fig. 3, looking in the direction of the arrows; and Fig. 6 is a fragmentary detail, partly in elevation and partly in section.

Referring to the drawings and more particularly to Figs. 1 and 3 thereof, 10 designates the chassis of a motor vehicle 11 of heavy-duty commercial type, which as shown, is provided with a front steering truck A and a rear driving truck B. The truck A, which forms no part of my invention, may be of the usual front axle type having wheels one of which is shown at 12. The rear or driving truck B, which comprises my invention, is equipped with two pairs of wheels 13 and 14 respectively. An engine 15 may be provided at its usual location at the forward portion of the vehicle and a driving shaft 16 provided with the usual universal joints 17, but one of which is shown, serves to transmit power from the motor, through suitable change speed gearing and clutch mechanisms, not shown, to the differential gearing contained within the gear box 18 of the live axle housing. Power is in turn transmitted from this differential gearing, by means of universal joints 19 and 20 and an intermediate drive shaft section 21 to the differential gearing contained within the gear box 22 of a second live axle housing.

These two live axle housings, the axles carried thereby, and their wheels together with their various other appurtenances to be subsequently described, comprise the rear or driving truck element B of the vehicle, and essentially embody two substantially identical drive units which for the sake of convenience will be subsequently referred to as the leading and trailing drive units respectively of the rear drive truck of the vehicle.

The wheels 13 of the leading drive unit are mounted, in the usual or any preferred manner, on the sections of a live axle 25 mounted within the axle housing 26, while the wheels 14 of the trailing drive unit are correspondingly mounted upon the sections of a live axle 23 mounted in the axle housing 24.

The weight of the rear portion of the vehicle body is suspended upon and distributed between the several axle housings by means of leaf springs 27 of the semi-elliptic type, the intermediate portions of which are pivotally connected to opposite side portions of the chassis, and the ends of which are correspondingly connected to the axle housings 24 and 26.

These leaf springs may each comprise a plurality of superposed curved springs or leaves 27a of progressively decreasing length from bottom to top, the several leaves being bound together by the clips 28. The central portion of each spring is bound by a wider band or clip 29 having an upstanding transversely perforated lug or bracket 30 to receive an outwardly extending trunnion or bearing pin 31 carried by the adjacent side frame member of the chassis and serving as a pivotal connection between the chassis and spring in such manner that the spring is free to oscillate relatively to the chassis. The springs at their ends have pivotal connection with brackets 32 and 33 respectively, mounted on the housings 24 and 26 near the ends thereof. By reason of this construction, it will be apparent that the weight of the rear end of the vehicle will be transmitted through the trunnions 31 and springs 27 to the rear axle housings and so to the two pairs of the traction wheels of the leading and trailing drive units.

As a means for bracing the axle housings of the drive units relative to each other I may provide a pair of torque rods 34 and 34a which, as best shown in Figure 4, are diagonally and oppositely secured relative to each other between the axle housings 24 and 26, one at each side of the rear truck element B. For example, one end of one torque rod may be secured by a connection 24a to the lower portion of the axle housing 26 adjacent to one end thereof, and its other end may be secured by a connection 26a to the upper portion of the axle housing 24, adjacent to the corresponding end thereof while one end of the other torque rod may be secured by a connection 26a to the upper portion of the first axle housing 26 near the end of the latter and at its opposite end by a connection 24a to the lower side of the second axle housing 24 near the corresponding end thereof.

Each connection 24a may comprise an eye bolt 24b secured to an axle housing and a pair of hinged joints 24c adjustably connecting the eye bolt and adjacent end of the torque rod, the axes of the two joints being at right angles to each other in each case. In like manner the connections 26a may each comprise an eye bolt 26b and a pair of hinged joints 26c. One hinge joint of each connection should have its axis vertically disposed while the axes of the other joints, are as a result horizontally disposed. Furthermore, the eye bolt at one end of each torque rod should be free to turn in its bearing while the other should be fixed in its bearing.

These torque rods, which may be solid or tubular in construction as preferred, neutralize the torque or torsional forces that develop or tend to develop within the axle housings because of the transmission of power from the axles therein through the traction wheels of the rear drive truck B, and they consequently serve to hold the housings in their proper relative positions. It should be noted that the torque rods are not subjected to bending strains but only to what I may term tension and compression stresses. By tension stresses I mean stresses tending to pull out or elongate the torque rods, and by compression stresses I refer to stresses tending to compress the torque rods longitudinally or shorten them.

Any suitable type or style of brake structure may be used, but great care must be taken in designing the actuating mechanisms therefor in order that the movement of the several wheels relative to each other and the chassis shall not affect the brakes to cause their undesired application or release.

To insure sufficient braking surface and uniform braking action I preferably provide each drive wheel with a brake drum 35d and mount within each drum laterally spaced pairs of brake shoes, only the inner pair of which is shown, in each case, in order to simplify the drawings and because this employment of two pairs of brake shoes to a drum is conventional braking practice on heavy duty commercial vehicles. Each brake mechanism comprises a pair of brake shoes 35 and 35a controlled by actuating links 35b, the links 35b of the outer pair of brake shoes, in each instance, being fixed to an operating shaft 35c while the links of the inner pair of brake shoes, in each instance, are fixed to an operating sleeve 35e mounted upon the adjacent shaft 35c. Brake actuating levers 36 are fixed to the inner ends of the shafts 35c and sleeves 35e of the brake mechanisms of the wheels of the leading drive unit while similar levers 37 are fixed to the shafts and sleeves of the brake mechanisms of the wheels of the trailing drive unit. In each instance the brake mechanism and its lever is so arranged that a forward swinging of each or any brake lever will cause engagement of the brake shoes of its brake mechanisms with their brake drums.

The ends of the brake levers of the outer sets of brake shoes are joined by pivotal and adjustable connections 38a to links 36a while the brake levers of the inner sets of brake shoes are joined by pivotal and adjustable connections 39a to links 37a. The links 36a and 37a of corresponding brake mechanisms of the leading and trailing drive units are joined by pivotal and adjustable connections 42 to brake actuating levers 43 pivoted upon brackets 43a secured to a cross-piece 43b of the chassis 10.

Springs 45 connected at one end to the chassis 10, as at 46, and at their other ends to the several levers 37 of the brake mechanisms of the rear drive unit B normally serve to hold all of the brakes in inactive or released position while draw links 44 connected to the free ends of the actuating levers 43 may be operated to apply the brakes. No actuating means for the draw links 44 are shown as they form no part of this invention and may be of conventional character. For example the draw links 44 connected to those levers 43 which control the outer brake shoes of each drive wheel may be connected, directly or indirectly, to a foot pedal so that the outer brake shoes may be employed as service brakes, while the remaining draw links 44 may be connected, directly or indirectly, to a hand lever so that the inner brake shoes may serve as emergency brakes.

The feature of importance in connection with the foregoing brake mechanisms is the fact that the points of connection of the several links 36a and 37a with the levers 43 are such that, considering all positions assumed by the levers 43 in service, the mean position of the pivots joining the links 36a and 37a with the levers 43 is in axial alignment with the trunions 31 which connect the driving truck to the chassis.

It will, of course, be apparent that inasmuch as the rear portion of the vehicle body is supported solely by the interposition of the springs between it and the live axle housings, the springs being pivoted to the frame of the body and to the housings, all four of the traction wheels will engage the road bed at all times, irrespective of any inequalities therein. At the same time it is very important that suitable bracing means be provided to maintain the rear axles in proper relative positions in order that the power delivered by them shall be efficiently utilized in the propulsion of the vehicle.

It is for this reason that I have provided the torque rods and have connected them between the axle housings in the manner previously set forth. Because of the double hinged connections at the ends of the torque rods and the swivelled connection between one end of each torque rod and one of the axle housings it is possible for the axle housings, and the wheels carried by the axles mounted therein, to swing so as to permit the wheels to properly engage the road bed under all conditions. At the same time it will be apparent that any turning moment imparted to either axle housing will, because of the torque rod connections between the upper portion of one housing and the lower portion of the other, be opposed by a reverse turning moment imparted to the second housing so that all power applied is in effect converted into a forward thrust exerted from the wheels through the axle housings and springs to the vehicle body itself.

Obviously with a brake actuating mechanism of the usual type the relative vertical displacement of certain of the driving wheels with respect to the others, occasioned by their passing over any inequalities in the road bed, would result, at times, in an undesired application of the brakes and, at other times, in an undesired releasing of the brakes intentionally applied. In order to counteract this I have provided the actuating levers 43 and have mounted them in such manner that their upper ends, which connect with the draw links of the brake actuating mechanisms, are, considering all positions assumed by them in service, in substantial axial alignment with the trunnions which support the drive truck. Because of this, relative vertical displacement of the wheels, with respect to each other and the vehicle body, either because of any inequalities in the road bed or on account of variations in the flexure of the springs, by reason of variations in the weight of the load carried by the vehicle, will not cause a swinging movement of the levers sufficient to effect any movement of the brake shoes themselves.

It will, of course, be noted that no provision has been made for turning either of the axles of the drive truck in a horizontal plane or for angularly directing the wheels carried by them to assist in steering. By actual practice and experience it has been found that this is unnecessary, particularly if the wheels are equipped with pneumatic tires. This is because of the fact that in turning, the tires of longitudinally aligned wheels of rear truck element yield laterally in opposite directions under the twisting strain applied to them so that the trailing wheels follow readily in the paths of the leading wheels, the rear portion of the vehicle pivoting, as it were, relative to the ground through this twisting action between the rim and tread portions of the tires.

By employing a rear truck element embodying a plurality of pairs of traction wheels it has been found that it is possible to employ traction wheels of the same size as the front or steering wheels of the vehicle, so that when pneumatic tires are employed all of the tires may be of the same size, whereas with the ordinary form of heavy-duty commercial vehicle much larger tires are required upon the rear wheels than upon those in front. Because of this permissible use of smaller tires, even though more of them are employed, the complete tire equipment is cheaper per service-mile and the tire and wheel equipment together is several hundred pounds lighter. Furthermore, I have found by experience that the two live axles and their housings may be made several hundred pounds lighter than the usual single rear axle and its housing as individually they do not have to support as much weight and are not subjected to anything like as severe strains.

By increasing the number of traction wheels in the manner set forth in this description a more uniform load distribution is insured and trucks constructed in accordance with my invention do not injure roads as now built as badly as four wheeled trucks of conventional design and of the same carrying capacity. Furthermore, a greatly increased braking surface is provided as each wheel is equipped with its own brake drum and shoes.

While I have described my invention in considerable detail and have illustrated these details in the drawings, it will be appreciated that I do not intend to in any way limit it to the particular arrangement of parts or specific features of construction disclosed, other than as may be indicated in the appended claims in which it is my intention to claim the invention, and all features thereof, as broadly as may be permitted by the prior art.

What I claim is:

1. In a motor vehicle, a chassis, a truck element mounted on said chassis to oscillate about a substantially horizontal axis, said truck element comprising a plurality of axles, wheels mounted on said axles, housings for said axles, said housings being pivotally mounted upon an axis spaced from the axle axis, and means for neutralizing the torsional forces in said axle housings.

2. In a motor vehicle, the combination with a chassis, of a plurality of rearwardly located drive axles disposed one behind the other, resilient means yieldably maintaining the several axles and the axles and the chassis in their proper relative positions, and means causing the torque imposed at one axle to directly oppose that imposed at the other axle.

3. A motor vehicle comprising a chassis, and a truck element mounted on said chassis to oscillate about a substantially horizontal axis, said truck element embodying a pair of semi-elliptical springs pivotally mounted on opposite sides of said chassis to oscillate about said horizontal axis, a pair of drive axles, a pair of housings for said axles, each end of each of said springs being pivotally connected to the respectively corresponding end of one of said housings, and a pair of crossed torque rods respectively extending from the tops of said respective housings to the bottom of the other housing, and a universal joint interposed between each end of each of said torque rods and the housing portion to which it is connected.

4. In a motor vehicle, a chassis, a truck element mounted on said chassis to oscillate about a substantially horizontal axis, said truck element comprising a plurality of axles, wheels mounted on said axles, housings for said axles, and means connecting the top of one axle housing to the bottom of the other housing, on the same side of the chassis to neutralize torsion forces on said axle housings.

5. In a motor vehicle, a chassis, a truck element mounted on said chassis to oscillate about a substantially horizontal axis, said truck element comprising a plurality of axles, wheels mounted on said axles, housings for said axles, and means, comprising rods, connecting the top of one of the axle housings to the bottom of the other housing on the same side of the chassis to neutralize torsion forces on said axle housings.

6. A motor vehicle comprising a chassis, a pair of rearwardly located drive axles, housings for the axles, a pair of leaf springs one of which is pivotally mounted intermediate its ends on each side of the rear portion of said chassis, a direct pivotal connection between each end of each housing and the corresponding end of one of the springs, and means independent of the springs connecting the housings and causing the torque developed in one housing to oppose and neutralize the torque developed in the other housing.

7. A motor vehicle comprising a chassis, a pair of rearwardly located drive axles, a housing for each of said axles, a semi-elliptical spring on each side of said chassis pivoted to the chassis at its middle point, and each spring having a single pivotal connection at each of its ends directly to the corresponding end of the respective housings, a torque rod extending from the top of the leading axle housing to the bottom of the other axle housing, and a second torque rod crossing the first named torque rod and extending from the bottom of the leading housing to the top of the trailing housing.

8. In a motor vehicle, a driving truck element comprising a plurality of axles, wheels mounted on said axles, housings for said axles, means for driving one of said axles, and means connecting the top of one of said axle housings to the bottom of the other housing to oppose the torsion forces on the housing of the driven axle.

9. A motor vehicle comprising a chassis, a pair of rearwardly located drive axles, housings for the axles, a semi-elliptical spring pivoted at its middle point to one side of the chassis and pivotally connected directly to the corresponding end of each housing, a second semi-elliptical spring similarly mounted on the other side of the said chassis, and torque neutralizing means connecting said housing independent of said springs, said means being pivotally connected at the ends thereof to each of said housings and adapted to prevent relative rotative movement of the respective housings, said means being connected to permit unhampered flexing of said springs.

10. In a motor vehicle, a chassis, a truck element comprising a plurality of axles, wheels carried by said axles, means for driving said axles and wheels, housings about said axles and a spring pivoted at its middle point to said chassis and having pivoted connections with said axle housings, and torque connections between said housings adapted to cause any slight rotation of one housing to rotate the other housing in an opposite direction.

11. In a motor vehicle, a chassis, a driving truck element, said truck comprising a plurality of axles each having an axle housing, wheels mounted on said axles, means for driving one of said axles, means connecting the top of each housing with the bottom of the other housing for opposing the torsion force on the housing for the driven axle, and a spring pivoted at substantially its middle point to said chassis, said truck element and spring having pivotal connections with said axle housings whereby said truck element and spring are free to oscillate, as a whole, about a substantially horizontal axis.

12. In a motor vehicle, a chassis, a driving truck element, said truck element comprising a plurality of relatively laterally movable axles, wheels mounted on the outer ends of said axles, housings about said axles, means for driving both of said axles, springs pivoted at the middle points thereof to said chassis and so mounted as to oscillate about substantially horizontal axes, said springs being pivoted at their ends to said housings, and independent tension and compression means connected to said housings to neutralize torsion forces in said housings.

13. In a motor vehicle, a chassis, a truck element comprising a plurality of axles, wheels mounted on said axles, housings about said axles, means for driving one of said axles, elements universally connected from the top of one of said axle housings to the bottom of the other axle housing on the same side of the chassis to oppose torsion forces developed in the housing for the driven axle.

14. In a motor vehicle, a chassis, a truck element comprising a plurality of relatively laterally movable axle housings provided with drive shafts, and means for neutralizing the torsional forces in said housings.

15. A motor vehicle comprising a chassis, a pair of rearwardly located axles, housings for the axles, a pair of leaf springs one of which is pivotally mounted intermediate its end on each side of the rear portion of said chassis, one end of each of said springs being pivotally connected directly to the corresponding end of the respective housings, and means extending between said housings independent of said springs and adapted to cause the torque developed in one housing to oppose and neutralize the torque developed in the other housing while permitting substantially unrestricted action of said springs.

16. In a motor vehicle, a chassis frame, a spring element, a truck element mounted on the chassis frame by means of the spring element to oscillate about a substantially horizontal axis, said truck element comprising a plurality of axles, wheels mounted on the axles, housings for the axles, said housings being pivotally mounted upon the spring element about an axis spaced from the axle axis, and means for neutralizing the torsional forces in said axle housings, said means including members mounted to cause the torque of one housing to oppose that of the other housing.

17. In a motor vehicle, a chassis frame, a truck element comprising a plurality of relatively laterally movable axle housings provided with drive shafts, and means for neutralizing the torsional forces in the housings, said means including members mounted to cause the torque of one housing to oppose that of the other housing.

18. A spring suspension including a supporting frame, a spring member pivoted thereon for movement in a vertical plane, and dual axles pivotally connected at the free ends of said spring and both being free for transverse movement toward and from each other caused by expansion of said spring.

In witness whereof, I have hereunto signed my name.

ELLIS W. TEMPLIN.